(12) United States Patent
Meek

(10) Patent No.: US 6,597,994 B2
(45) Date of Patent: Jul. 22, 2003

(54) SEISMIC PROCESSING SYSTEM AND METHOD TO DETERMINE THE EDGES OF SEISMIC DATA EVENTS

(75) Inventor: Robert A. Meek, Ponca City, OK (US)

(73) Assignee: Conoco Inc., Houston, TX (US)

( * ) Notice: Subject to any disclaimer, the term of this patent is extended or adjusted under 35 U.S.C. 154(b) by 0 days.

(21) Appl. No.: 09/747,548

(22) Filed: Dec. 22, 2000

(65) Prior Publication Data

US 2002/0116131 A1 Aug. 22, 2002

(51) Int. Cl.$^7$ ................................................. G01V 1/28
(52) U.S. Cl. ......................................................... 702/16
(58) Field of Search ............................. 702/14, 17, 16; 367/72, 73

(56) References Cited

U.S. PATENT DOCUMENTS

| | | | |
|---|---|---|---|
| 4,916,615 A | 4/1990 | Chittineni | 364/421 |
| 5,563,949 A | 10/1996 | Bahorich et al. | 364/421 |
| 5,892,732 A * | 4/1999 | Gersztenkorn | 367/72 |
| 5,940,778 A | 8/1999 | Marfurt et al. | 702/16 |
| 5,995,907 A | 11/1999 | Van Bemmel et al. | 702/16 |

OTHER PUBLICATIONS

Ulrych et al., "Tutorial, Signal and Noise Separation: Art and Science", Geophysics, vol. 64, No. 5, Sep.–Oct. 1999, p. 1648–1656.*

Kirlin, "New Maximum Entropy Spectrum Using Uncertain Eigenstructure Constraints", IEEE ransactions on Aerospace and Electronic Systems, vol. 28, No. 1, Jan. 1992, p. 2–14.*

*A Linear Coding For Transmitting A Set Of Correlated Signals*, H. P. Kramer et al., IRE Transactions on Information Theory, IT–2, 41–46, 1956.

*Complex Seismic Trace Analysis*, M. T. Taner et al., Geophysics, vol. 44, No. 6 (Jun. 1979); p. 1041–1063 16 Figs., 1 Table.

(List continued on next page.)

Primary Examiner—Donald E. McElheny, Jr.
(74) Attorney, Agent, or Firm—Conley Rose, P.C.

(57) ABSTRACT

A seismic processing system and method calculates a coherency estimate for a volume of seismic data to detect edges of seismic events. The method includes selecting a portion of the seismic data volume for analysis, selecting a spatial and temporal position in the subset seismic data volume, selecting a subset of seismic samples around seismic position, placing subset seismic sample volume in a matrix, or calculating cosine of instantaneous phase of subset of seismic samples and placing those samples in a matrix, and calculating a coherency estimate for that matrix. The coherency estimate is calculated using either eigenvalue, maximum likelihood or maximum entropy analysis. The coherency estimate is then written to a coherence seismic volume and another spatial and temporal seismic sample position is selected and the process is repeated until all coherence samples are computed for the seismic data volume. Finally, the coherence seismic data volume can be examined and analyzed for useful information.

54 Claims, 4 Drawing Sheets

OTHER PUBLICATIONS

*Multiple Emitter Location And Signal Parameter Estimation*, R. O. Schmidt, IEEE Transactions on Antennas and Propagation, vol. AP–34, No. 3, Mar. 1986 (5 p.).

*Semblance And Other Coherency Measures For Multichannel Data*, N. S. Neidell et al., Geophysics, vol. 36 No. 3 (Jun. 1971), P. 482–497, 6 Figs., 1 Table.

*Signal–To–Noise Ratio Enhancement In Multichannel Seismic Data Via The Karhunen–Loeve Transform*, I. F. Jones et al., Geophysical Prospecting 35, 12–32, 1987.

*High–resolution Velocity Spectra Using Eigenstructure Methods*, B. L. Biondi et al., Geophysics, vol. 54, No. 7 (Jul. 1989); P. 832–842, 9 Figs.

*Algorithm 358 Singular Value Decomposition of a Complex Matrix*, P. A. Businger et al., Communications of the ACM, vol. 12, No. 10, Oct., 1969 (2 p.).

*High–Resolution Frequency–Wavenumber Spectrum Analysis*, J. Capon, Proceedings of the IEEE, vol. 57, No. 8, Aug. 1969, pp. 1408–1419.

*Application of the Maximum–Likelihood Method (MLM) for Sonic Velocity Logging*, K. Hsu et al., Geophysics, vol. 51, No. 3 (Mar. 1986); P. 780–787, 12 FIGS.

*Maximum Entropy Spectral Analysis*, John Parker Burg, May, 1975, pp. 1–18.

G. Golub, *Calculating The Singular Values And Pseudo–Inverse Of A Matrix*, Symposium on Matrix Computations, Apr. 1964, pp. 205–224.

Kurt J. Marfurt, *3–D Seismic Attributes Using A Semblance–Based Coherency Algorithm*, XP–002195379, Geophysics, vol. 63, No. 4, Jul.–Aug. 1998, pp. 1150–1165.

PCT Search Report dated Oct. 24, 2002, PCT/US01/48417 (7 P.).

* cited by examiner

SEISMIC PROCESSING SYSTEM AND METHOD TO DETERMINE THE EDGES OF SEISMIC DATA EVENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to seismic data processing. More specifically, the invention relates to computing coherency values corresponding to edges of seismic reflections to assist in locating subsurface faults, channels and other geological entities using eigenvalue, maximum entropy, or maximum likelihood analysis.

2. Background of the Invention

The field of seismology focuses on the use of artificially generated elastic waves to locate mineral deposits such as hydrocarbons, ores, water, and geothermal reservoirs. Seismology also is used for archaeological purposes and to obtain geological information for engineering. Exploration seismology provides data that, when used in conjunction with other available geophysical, borehole, and geological data, can provide information about the structure and distribution of rock types and contents.

Most oil companies rely on seismic interpretation to select sites for drilling exploratory oil wells. Despite the fact that the seismic data is used to map geological structures rather than find petroleum directly, the gathering of seismic data has become a vital part of selecting the site of exploratory and development wells. Experience has shown that the use of seismic data greatly improves the likelihood of a successful venture.

Seismic exploration generally involves a multitude of equipment placed on the ground. At least one piece of equipment creates and imparts vibrational energy into the ground. That energy may be in the form of a relatively short duration, large amplitude "impulse" or longer duration, lower amplitude vibrations. The energy imparted to the ground propagates generally downward and reflects off various subsurface structures, such as interfaces between different rock formations. The reflected energy waves propagate back upward to the surface and are detected by sensors called "geophones."

In seismic exploration it is common practice to deploy a large array of geophones on the surface of the earth and to record the vibrations of the earth at each geophone spatial location to obtain a collection of seismic traces. The traces are sampled and recorded for further processing. When the vibrations so recorded are caused by a seismic source activated at a known time and location, the recorded data can be processed by a computer in known ways to produce an image of the subsurface. The image thus produced is commonly interpreted by geophysicists to detect the presence of hydrocarbons.

A "seismogram" is the record recorded from a geophone. Seismograms are commonly recorded as digital samples representing the amplitude of a received seismic signal as a function of time. Because seismograms are usually obtained along several lines of exploration on the surface of the earth, the digital samples can be formed into a 3-dimensional array with each sample in the array representing the amplitude of the seismic signal as a function of time (t) and position on the earth (x,y). The collection of seismic samples as a function of time (t) for one position in the earth is referred to as a "seismic trace." The collection of seismic traces forming an array are commonly referred to as "seismic data volumes."

A seismic data volume depicts the subsurface layering of a portion of the earth. It is the principal tool that a geophysicist uses to determine the nature of the earth's subsurface formations. The seismic data volume can be studied either by plotting it on paper or displaying it on a computer monitor. A geophysicist then can interpret the information. When displaying the seismic data volume along a principle direction, crosslines, inlines, time slices, or horizon slices can be made. The seismic data volume can be mathematically processed in accordance with known techniques to make subtle features in the seismic data more discernable. The results of these processing techniques are known as seismic "attributes."

Several types of seismic attributes are useful, such as those disclosed in "Complex Seismic Trace Analysis" by Tanner, Koehler, and Sheriff, 1979, Geophysics, vol. 44, no. 6, pp. 1041–1063, incorporated herein by reference in its entirety. The instantaneous phase attribute, for example, is generally insensitive to amplitude and measures the continuity of seismic events. It can be used to show subtle unconformities where subsurface layers are truncated by an erosion surface. Further, the apparent polarity attribute has been used to discern between gas and water containing reservoirs. The reflection strength attribute has been used to discern between chalk (high amplitude) and sands/shales (low amplitude). Such attributes are known as complex trace attributes and are derived by using the well-known Hilbert Transform.

These complex trace attributes operate on individual seismic traces. Neidel and Taner, 1971, Geophysics, vol. 36, no. 6, p. 482–497 introduced the concept of semblance or coherency which measures the trace-to-trace continuity of seismic events. Neidel and Taner measured the coherency to determine the velocity of seismic events. Coherency can also be used to determine the edges of seismic events to enable the interpretation of subtle faults and channels in the subsurface when displayed along time slices or horizon slices. Coherency measures the similarity between adjacent seismic samples. When the seismic samples are similar to one another, such as would be the case for reflections along a continuous subsurface formation, the coherency will generally be high. Conversely, when the seismic samples are dissimilar, such as across a fault cutting a subsurface formation, the coherency will be much lower. By measuring the degree of coherency in the seismic data volume, subsurface faults and other features that disturb the continuity of seismic events can be detected and interpreted by geophysicists.

Various techniques for determining coherency have been suggested. For example, in U.S. Pat. No. 5,563,949 to Bahorich and Farmer, the seismic data volume is divided into horizon slices in which the data is separated along reflections. These horizon slices are then divided into cells that contain seismic data along the inline and crossline directions. The "similarity" is measured for both the inline and crossline traces, and the result combined into a coherency estimate for that particular cell. Bahorich and Fanner's algorithm continues until estimates of coherency are determined for all cells within the seismic data volume. In Bahorich's method the similarity is measured by searching for the maximum cross-correlation value in the neighboring traces. In some cases because of noise or other types of interference this search disadvantageously may not represent the overall similarity of the actual seismic data. Furthermore, Bahorich's method only uses traces in the inline and crossline direction, but not in other directions.

In U.S. Pat. No. 5,940,778 to Marfurt, Kirlin, and Gersztenkorn the seismic data volume is divided into cells containing at least three traces inline, three traces in the crossline direction, and five seismic samples in time. These seismic samples are formed into a data matrix. A "similarity" matrix is then calculated from this data matrix. Then, the principle "eigenvalue" (a mathematical quantity well-known to those of ordinary skill in the art) is calculated from the similarity matrix. A measure of the power in the similarity matrix is then calculated by computing the matrix trace of the similarity matrix. The coherency is finally calculated by dividing the principle eigenvalue by the trace of the similarity matrix. Marfurt et al's algorithm continues until estimates of coherency are determined for all cells within the seismic data volume. Marfurt and Gertztenkorn's methods calculate the eigenvalues from a similarity matrix calculated from the seismic data and, as such, is relatively complex, computationally intensive and inaccurate for smaller eigenvalues. Furthermore, Marfurt et al method uses the seismic data without any enhancement to remove noise and other artifacts.

The methods of Bahorich et al and Marfurt et al provide generally satisfactory techniques for determining coherency of a seismic data volume to determine the positions of subsurface faults, channels and other subtle geological features that cause discontinuities in the seismic data volume. These techniques, however, are not without various disadvantages such as those noted above. Accordingly, a technique for determining coherency of a seismic data volume that addresses these issues is needed.

BRIEF SUMMARY OF THE INVENTION

The problems noted above are solved in large part by a seismic data processing system and method. The system processes seismic data that has been acquired in the field and pre-processed in a suitable manner. Then, a subset of the seismic data volume or the entire cube is chosen for analysis. This subset might be between known reservoirs, along a geologic horizon of interest, shallow areas to determine geologic hazards before drilling, or other area of interest. Beginning at a selected spatial and temporal position in the subset seismic data volume, a subset seismic sample volume is selected surrounding this position containing several seismic samples defined by a rectangular box. These seismic samples are then placed in an m by n data matrix, where m represents the number of seismic spatial positions x,y, and n represents the number of seismic time samples. This m by n data matrix is then subject to singular value decomposition to compute n eigenvalues. The coherence of this particular data is then calculated by raising the maximum eigenvalue to a power k selected by the user and dividing this value by the sum of all the eigenvalues raised to the same value k. This coherence value is then saved to another coherence seismic data volume. The algorithm repeats at the next temporal position and then in the spatial x and y positions until coherency estimates are computed for all positions in the selected subset of the seismic data volume of interest. The coherency estimates can then be analyzed for useful information regarding the existence and location of various types of geologic formations, such as faults.

In an alternate embodiment, the cosine of the instantaneous phase attribute of the seismic sample is calculated using several seismic samples around the sample. The calculated cosine of the phase is stored into the m by n data matrix instead of the seismic data itself. This removes amplitude information from the seismic data trace, reducing noise and making the coherence estimate more effective. The algorithm then proceeds as described above.

In an alternative embodiment to computing eigenvalues, the coherency estimate is computed either using a maximum likelihood technique or a maximum entropy technique. Both of these latter techniques involve computing a covariance matrix, normalizing the covariance matrix and computing the coherency estimate as a function of the inverse of the covariance matrix.

Accordingly, the subject matter described herein provides an effective technique of calculating a coherency estimate for a volume of seismic data so that subtle geologic features such as faults and channels can be more easily seen by geophysicists. These and other advantages will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, seismic companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
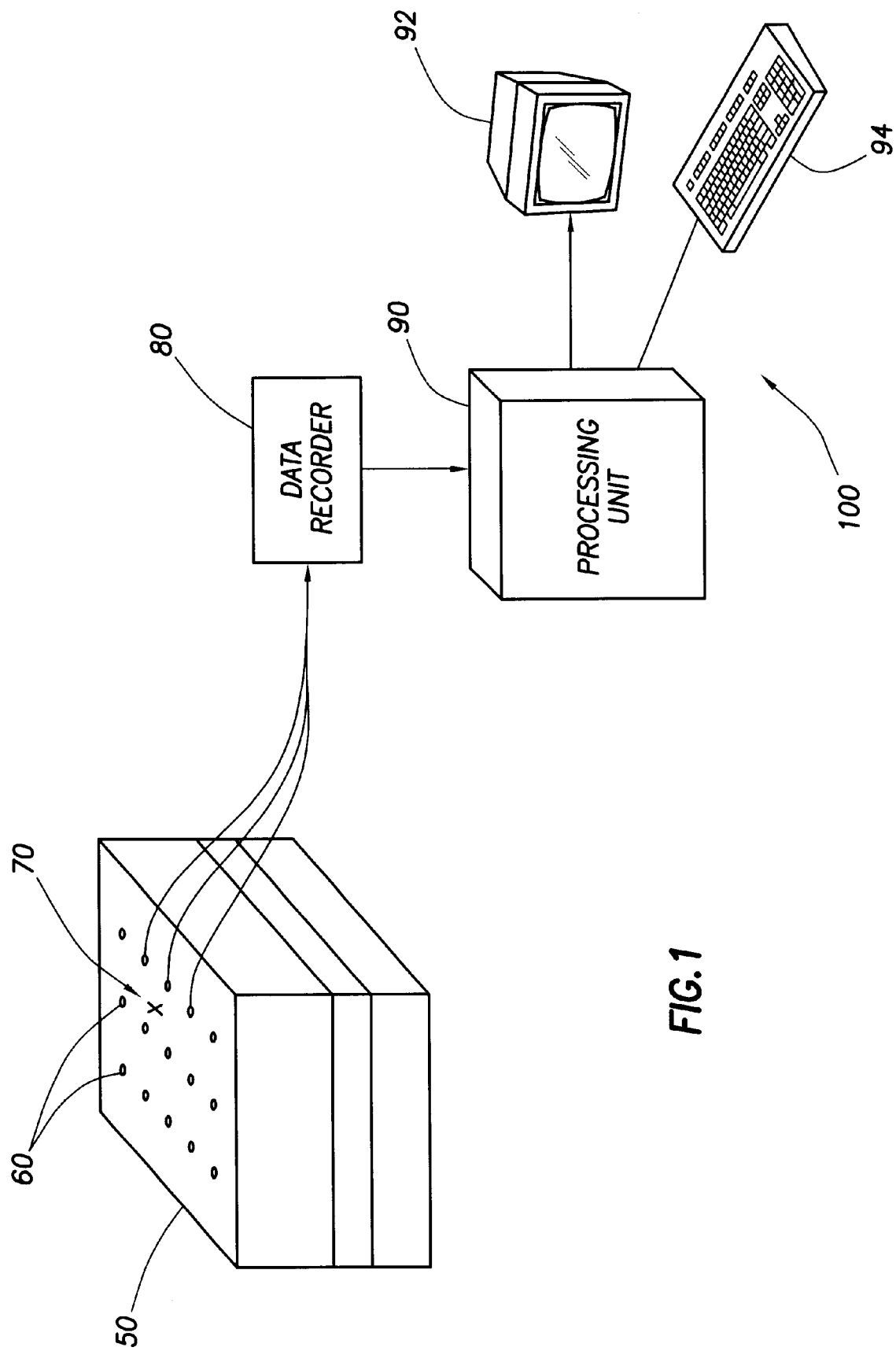
FIG. 1 shows an exemplary layout of seismic equipment on the surface of the earth.

Referring now to FIG. 1, in accordance with conventional seismic data acquisition techniques, a plurality of geophones 60 and at least one seismic source 70 are placed at predetermined locations on the surface of the earth 50. The source 70 and geophones 60 preferably couple to a suitable type of data recorder 80. The data recorder 80 may be connected directly to a computer system 100 which processes the data. Alternatively, the raw seismic data recorded by data recorder 80 may be stored on a removable storage medium (e.g., magnetic tape or other type of suitable storage medium). The storage medium can then be provided to the computer system 100. In either case, the raw seismic data is provided to the computer system 100 which preferably comprises a processing unit 90, a display 92 and an input device (e.g., keyboard) 94. The computer system 100 may be a mainframe computer or any other type of computer with suitable processing power to perform the computations described below.

Figure 2:
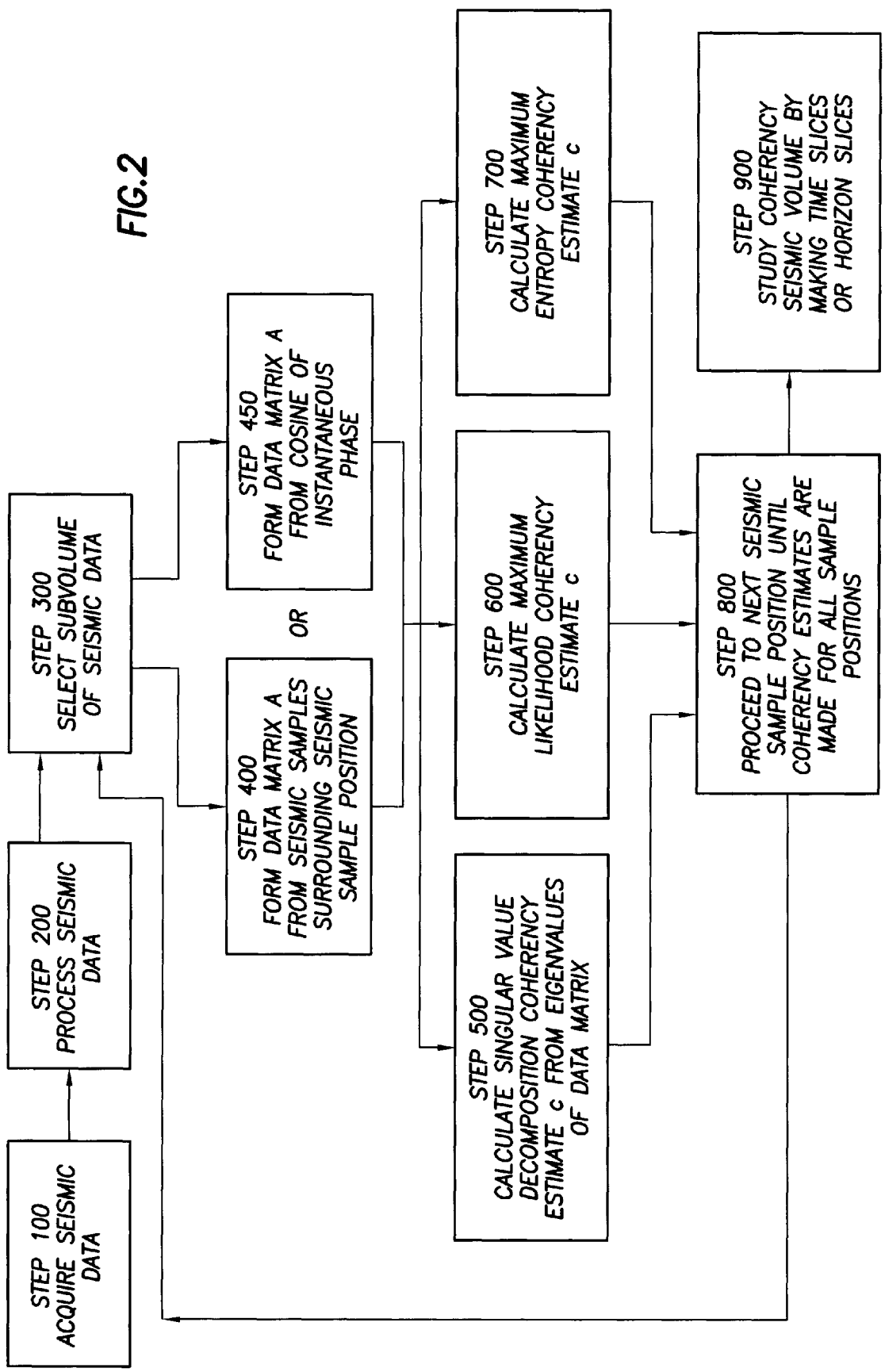
FIG. 2 shows a method of determining coherency in accordance with a preferred embodiment of the invention.

Referring now to FIG. 2, the preferred method of computing a coherency value for seismic data is shown. The method begins at step 100 with the acquisition of seismic data in the field using any one of numerous well-known seismic exploration techniques. In general, an artificial disturbance may be generated along the earth by the use of source 70 such as an airgun or the like. The resulting acoustic waves travel downward in the earth and are reflected upward from subsurface reflecting interfaces. The reflected waves are received at geophones 60 or other types of detectors located along the surface of the earth 50 and recorded in reproducible form as seismograms. The seismograms are then collected along predefined spatial positions along the surface of the earth.

In step 200 the resulting seismograms are then subjected to seismic processing in well known ways. The following techniques exemplify such processing. First, the data may have the source signature removed, then the data may be frequency filtered, resampled, and then sorted to common midpoint gathers. Next the gathers might be subjected to multichannel filters to remove noise and multiples (a multiple is an event that has undergone more than one reflection). The gathers then may be migrated or stacked and migrated. This is repeated for all seismograms that were recorded. The stacked gathers then result in a seismic data volume that can then be interpreted by the geophysicist. The seismic data volume so created is referred to as "a(t,x,y)" which is a matrix containing the processed seismic data samples.

Figure 3:
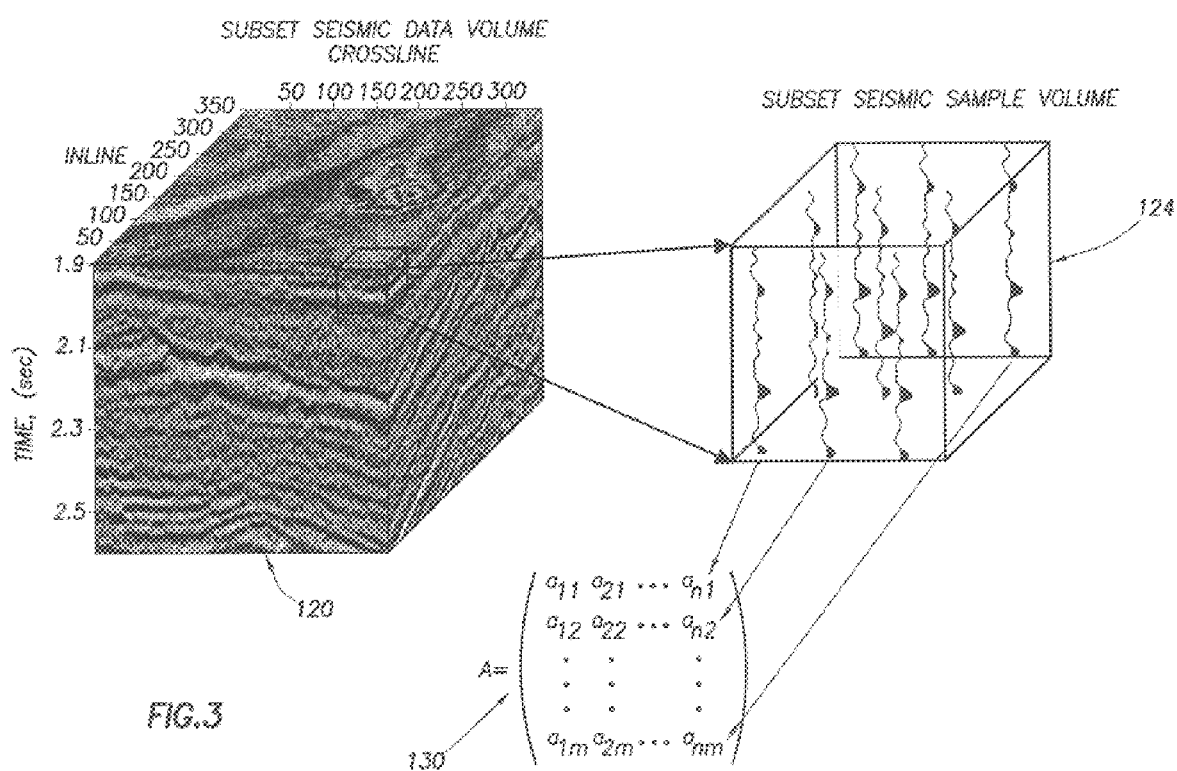
FIG. 3 shows the selection of a subset of the total seismic data volume to be used in the method of FIG. 2.

Proceeding to step 300 a portion of the seismic data volume of a(t,x,y) is selected for seismic attribute generation. The portion so selected is shown in an exemplary seismic data set by reference numeral 120 in FIG. 3. This portion of the seismic data volume may be the entire volume or a subset that is of particular interest to the geophysicist. For example, around an existing hydrocarbon producing reservoir the geophysicist may wish to know the locations of small faults that are difficult to observe in the seismic data. Another example would be around a sand channel to see the distributions and limits that cannot be readily observed in the existing seismic data.

At step 400 a spatial position is chosen in this subset 120 of the seismic data volume. Various surrounding seismic data samples are then selected based on this position, as identified by reference numeral 124 in FIG. 3. The selected data samples preferably include three seismic traces in the inline direction, three seismic traces in the crossline direction, and five seismic time samples in each trace, although the selection can be varied as desired. The samples chosen in each trace may be, for example, five consecutive samples with respect to time, or selected in some other manner as desired. This results in a subset seismic sample volume 124 containing nine seismic traces, each trace having five time samples. These seismic samples 124 are then placed in an m by n data matrix A (identified by reference numeral 130), where m is the number of traces, nine in this case, and n is the number of seismic time samples, five in this case.

Step 450 is an alternative to step 400. In step 450, the A matrix 130 can also be formed from the attribute well-known to those of ordinary skill in the art as the cosine of the instantaneous phase. See e.g., "Complex Seismic Trace Analysis" by Tanner, Koehler, and Sheriff, 1979, Geophysics, vol. 44, no. 6, pp. 1041–1063, incorporated herein by reference in its entirety, which describes how a seismic trace can be converted to a "complex" trace through the use of the Hilbert transform. A complex value is one that has real and imaginary components. Several attributes can be calculated from such a complex trace, and such attributes are useful in analyzing seismic data. The instantaneous phase is generally insensitive to amplitude and can be used to show geologic unconformities in the seismic data. The cosine of the instantaneous phase can further improve the definition of faults when used in conjunction with the method disclosed herein.

Step 450 may be carried out in the following manner. First, a complex trace a*(i) preferably is calculated using the Hilbert transform (the * indicates that the values are complex) as:

$$a^*(i) = 2/\pi \sum_{n=-L}^{L} a(i-n)\sin^2(\pi n/2)/n, \text{ for } n \neq 0$$

where a(i) are the samples in the seismic sample traces 124, and L is the number of samples around the sample value i. The value L preferably is 3*n. In the current example, L=15.

The instantaneous phase is then defined by:

$$\theta(i) = \tan^{-1}(a^*(i)/a(i))$$

and the cosine of the phase by:

$$v(i) = \cos(\theta(i))$$

As such, in step 450 the instantaneous cosine phase seismic samples v(i) can then be placed into the data matrix A as an alternative to using the actual seismic samples a(i) as in step 400.

Referring still to FIG. 2, computing a coherency value for the data in matrix A can be performed using any of three alternative techniques (steps 500, 600 700) and variations thereof. In step 500, the singular value decomposition coherency estimate is calculated from the so-called "eigenvalues" of matrix A. Singular value decomposition is a well-known technique in signal processing. See, for example, "A linear coding for transmitting a set of correlated signals," Kramer and Mathews, IRE Transactions on Information Theory, IT-2, pp 41–46 (1956); "Signal-to-Noise Ratio Enhancement in Multichannel Seismic Data via the Karhunen-Loeve Transform," Jones & Levy, Geophysical Prospection, Vol. 35, pp. 12–32 (1987); "High-Resolution Velocity Spectra Using Eigen Structure Methods," Biodi and Kostov, Geophysics, Vol. 54, pp. 832–842 (1989); "Covariane Analysis For Seismic Processing," Kirlin & Done, Society of Exploration Geophysicists, Tulsa, Okla. (1999); "Digital Spectral Analysis With Applications," Marple, Prentice-Hall, Inc., Englewood, Cliffs, N.J. (1987); all of which are incorporated herein by reference in their entirety.

In general, eigenvalues (also called singular values) are those scalars that satisfy the following equation:

$$Gx = \lambda x$$

where G is an n by n symmetric matrix, λ is the scalar also known as a singular value or eigenvalue, and x is the eigenvector of the matrix G associated with λ. The matrix G will have n eigenvalues and n eigenvectors. The principle eigenvectors are those associated with the largest magnitude eigenvalues of G. If a matrix, such as G, contains values that are very similar (i.e., coherent), the principle eigenvalue will be significantly larger than the remaining eigenvalues. If the matrix G contains values that are not similar, all the eigenvalues will have similar values. This principle is used in step 500 to determine coherence.

In general, the data matrix A is not symmetric, but rather is an m by n matrix. To apply the eigenvalue principle described above, the matrix A preferably is decomposed as in Marple, 1987, Digital Spectral Analysis, Prentice-Hall Inc., New Jersey, into a set of matrices as follows:

$$A = UEV^T$$

where the superscript T is the well-known transpose operator, the matrix U is an m by m symmetrical matrix containing the eigenvectors of the matrix product $AA^T$, the matrix V is an n by n matrix containing the eigenvectors of the matrix product $A^TA$, and E is a matrix of the structure:

$$E = \begin{pmatrix} D & 0 \\ 0 & 0 \end{pmatrix}$$

where D is a diagonal matrix containing the eigenvalues $\lambda_i$. That is, matrix D has non-zero values only on its principle diagonal and those values are the eigenvalues $\lambda_i$. Thus, D is:

$$D = \begin{pmatrix} \lambda_1 0 \ldots 0 \\ 0\lambda_2 \ldots 0 \\ \vdots \\ \ldots 0 \lambda_n \end{pmatrix}$$

The singular value decomposition method of step 500 assumes that m>n, meaning that there are more seismic traces than seismic time samples being analyzed. The method also assumes matrix A is non-singular (i.e., the matrix is invertible). The calculation of the eigenvalues and corresponding eigenvectors directly from the matrix product ATA or AAT is inaccurate and unstable for small eigenvalues using ordinary floating point arithmetic. The calculation is more accurate using double precision arithmetic, but this is more expensive than single precision and also not accurate. In accordance with the method, the equation $A=UEV^T$ is then solved to calculate n distinct eigenvalues using the algorithm described in "Singular Value Decomposition of a Complex Matrix," Businger and Glub, Communications of the ACM, Vol. 12, No. 10 (1969).

This method is a fast and accurate method of obtaining the eigenvalues. It uses a series of Householder transformations to transform the data matrix into a bidiagonal matrix and then applies an iterative procedure designed to use orthogonal transformations to produce bidiagonal matrices, which are successively more diagonal.

Businger and Glub's paper is an implementation of Golub and Kahan, 1965, method of calculating singular values. Once the eigenvalues are calculated for the sample seismic volume, the coherency estimate is then calculated using the following equation:

$$c = \frac{(\lambda_{max})^k}{\sum_{i=1}^{n} (\lambda_i)^k}$$

where c is the coherency estimate, $\lambda_{max}$ is the largest of all of the eigenvalues, $\lambda_i$ are all the eigenvalues for the matrix A, and the scalar k the power to which the eigenvalues are raised. If the seismic samples are very similar in the data matrix, $\lambda_{max}$ will be relatively large compared to all the other eigenvalues, and the coherency estimate, c, will then be relatively close to 1.0. If the seismic samples are not similar, such as those across a fault or channel, $\lambda_{max}$ will be nearly the same magnitude as the remaining eigenvalues, and the coherency estimate, c, will then be substantially less than 1.0. By adjusting the scalar k, major or minor faults or other features can more easily be seen in the seismic data. For a larger k the more dominant faults will be seen. More discontinuities can be seen with a smaller k. Preferably, k is 2.0.

As an alternative to step 500, in step 600 the coherency estimate can alternatively be calculated using a technique known as "maximum likelihood." The maximum likelihood method is generally described in "High-Resolution Frequency-Wave Number Spectrum Analysis," Capon, Instr. Elect. Electron Eng., Vol. 57, pp. 1408–1418 (1969); "Digital Spectral Analysis With Applications," Marple, Prentice-Hall, Inc., Englewood, Cliffs, N.J. (1987); "Multiple Emitter Location and Signal Parameter Estimation," IEEE Transactions On Antennas and Propagation, Vol. Ap-34, No. 3., all of which are incorporated herein by reference in their entirety. First, a covariance matrix, C, is calculated from the data matrix using the equation:

$$C = A^T A$$

The covariance matrix C preferably is then normalized according to a method described in "Application of the Maximum-Likelihood Method (MLM) for Sonic Velocity Logging," Hsu and Baggeroer, Geophysics, Vol. 51, No. 3, pp. 780–787, incorporated herein by reference in its entirety, as follows:

$$C = \left( \prod_{i=1}^{m} C_{ii} \right) X \left( \frac{C_{ij}}{C_{ii}^{1/2} C_{jj}^{1/2}} \right)$$

The maximum likelihood estimate c is then computed as follows:

$$c = \log \frac{1}{b^T C^{-1} b}$$

where $C^{-1}$ is the inverse of matrix C and b is a vector in which all elements are equal to 1. The method of step 600 advantageously preserves some of the amplitude in the data and determines the position of larger faults.

Alternative step 700 comprises a maximum entropy method. This method was generally developed for high resolution spectral analysis. See Burg, J. P., Maximum Entropy Spectral Analysis Ph.D. dissertation, Dept. of Geophysics, Stanford University, Burg (1975), which is incorporated herein in its entirety. Similar to the method of step 600, a covariance matrix, C, is calculated using the above formula and normalized. The maximum entropy estimate is then calculated from the following equation:

$$c = \log \frac{1}{b^T c^T c b}$$

where c is a column selected from the matrix $C^{-1}$. Preferably, the middle column is chosen for analysis. However, if desired, other columns could be selected and used in this technique. In fact, the maximum entropy estimate can be calculated multiple times, each time using a different column of the matrix $C^{-1}$. The results can be compared in light of features of interest to a geophysicist and the best results selected. This maximum entropy method advantageously preserves the amplitude of the data and also provides a relatively high resolution definition of the faults.

Regardless of the technique chosen for calculating a coherence estimate, in step 800 the process proceeds to the next seismic data sample position in the volume and steps 300, 400 (or 450), and 500 (or 600 or 700) are repeated. The process also continues in the crossline and inline directions, then for all time samples in the subset seismic data volume. Once all coherency estimates for each seismic data sample position are calculated the coherency estimates are written to a new data volume. This data volume thus is a collection of the coherency estimates and is analyzed in step 900. Alternatively, the coherency estimates may be written to a new data volume as they are calculated.

Figure 4:
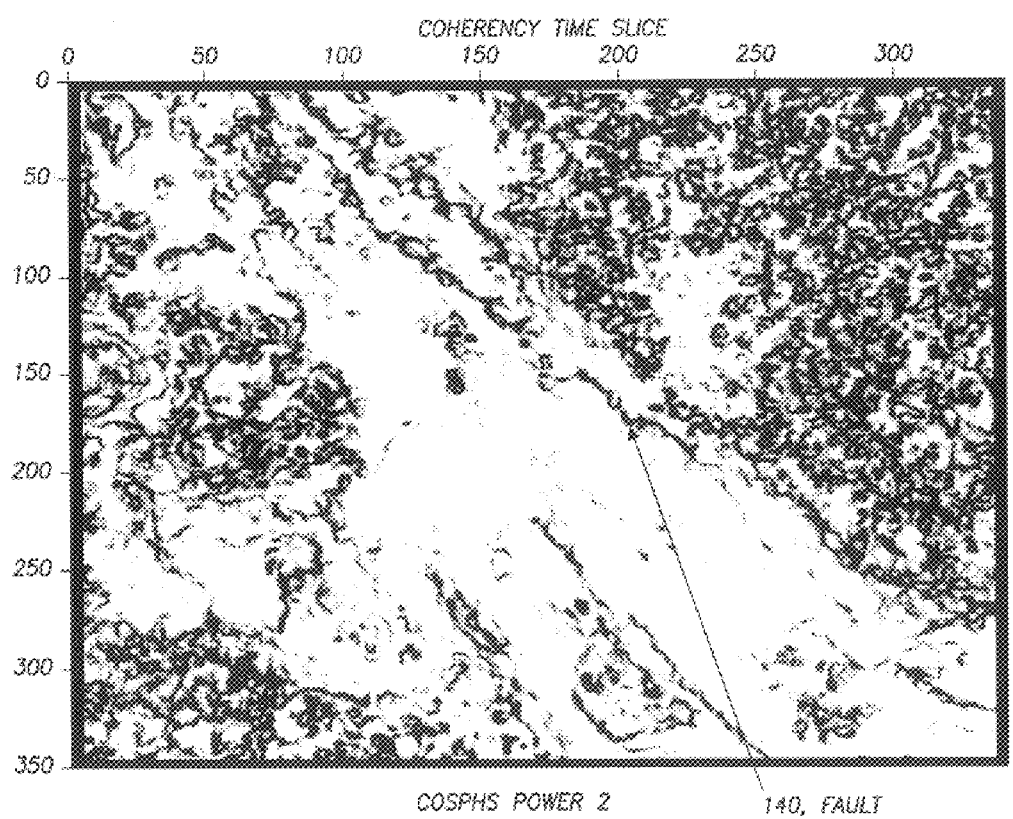
FIG. 4 shows the results of the method of FIG. 2 for identifying subtle geologic features.

At step 900 a geophysicist can study the coherency data volume in accordance with any suitable technique. For example, the analysis may include observing the coherency at all spatial x,y positions for at a constant time. An example of this is shown in FIG. 4 which shows an exemplary subset of the coherency estimates for a point in time. In the plot of FIG. 4, coherency estimates of 0.0 are shown in black, while white represents estimates of 1.0. Coherency estimates between 0 and 1 are represented in a corresponding gray scale between black and white. Large faults in the subsurface can thus be seen as dark lines in FIG. 4. One such fault 140 is identified. Alternatively the geophysicist may extract all the coherency values along a particular seismic horizon representing a formation boundary in the subsurface. Such displays will show the geophysicist where faults in reservoirs may occur, the edges of subsurface channels and other types of features that are difficult to see in normal seismic data.

Thus, there has been described an effective technique of calculating a coherency estimate for a volume of seismic data. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of seismic data processing, comprising:
   (a) acquiring seismic data;
   (b) forming a data matrix from said seismic data; and
   (c) calculating a coherency estimate for said data matrix using eigenvalues of said data matrix, wherein a similarity matrix is not calculated.

2. The method of claim 1 wherein (c) includes decomposing said data matrix into three matrices.

3. The method of claim 1 wherein (c) includes representing the data matrix as $UEV^T$, where T is the matrix transpose operator, U comprises a matrix containing the eigenvectors of a product of the data matrix ("A") and the transpose of A, $V^T$ comprises the transpose of a matrix containing the eigenvectors of a product of $A^TA$, and E comprises zero values and the eigenvalues of A.

4. The method of claim 3 wherein (c) further includes calculating said eigenvalues.

5. The method of claim 4 wherein (c) further includes calculating said coherency estimate as a function of the maximum eigenvalue of said eigenvalues.

6. The method of claim 4 wherein (c) further includes calculating said coherency estimate as the maximum eigenvalue raised to a power k divided by a sum of each of the eigenvalues each eigenvalue in said sum raised to the power k.

7. The method of claim 6 wherein k is approximately 2.

8. The method of claim 6 wherein k can be varied to emphasize geologic features in said seismic data.

9. The method of claim 1 wherein (b) includes selecting samples surrounding a selected position in said seismic data.

10. The method of claim 1 wherein (b) includes calculating a cosine of a phase associated with a complex trace computed from a seismic trace.

11. The method of claim 10 wherein said complex trace is computed using a Hilbert transform.

12. A method of seismic data processing, comprising:
    (a) acquiring seismic data;
    (b) forming a data matrix from said seismic data; and
    (c) calculating a maximum likelihood coherency estimate for said data matrix, wherein eigenvalues are not utilized to calculate said maximum likelihood coherency estimate.

13. The method of claim 12 wherein (c) includes computing a covariance matrix.

14. The method of claim 12 wherein (c) includes computing a product of the transpose of the data matrix ("A") and A.

15. The method of claim 13 wherein (c) further includes normalizing said covariance matrix.

16. The method of claim 15 wherein (c) further includes computing the logarithm of $1/(b^TC^{-1}b)$, wherein b is a vector in which all elements are 1, $C^{-1}$ is the inverse of the normalized covariance matrix and T is a transpose operator.

17. The method of claim 12 wherein (b) includes selecting samples surrounding a selected position in said seismic data.

18. The method of claim 12 wherein (b) includes calculating a cosine of a phase associated with a complex trace computed from a seismic trace.

19. The method of claim 18 wherein said complex trace is computed using a Hilbert transform.

20. A method of seismic data processing, comprising:
    (a) acquiring seismic data;
    (b) forming a data matrix from said seismic data; and
    (c) calculating a maximum entropy coherency estimate for said data matrix, wherein eigenvalues are not utilized to calculate said maximum entropy coherency estimate.

21. The method of claim 20 wherein (c) includes computing a covariance matrix.

22. The method of claim 20 wherein (c) includes computing a product of the transpose of the data matrix ("A") and A.

23. The method of claim 21 wherein (c) further includes normalizing said covariance matrix.

24. The method of claim 23 wherein (c) further includes computing the logarithm of $1/(b^Tc^Tcb)$, wherein b is a vector in which all elements are 1, $c^T$ is a transposed column of the inverse of the normalized covariance matrix, and T is a transpose operator.

25. The method of claim 20 wherein (b) includes selecting samples surrounding a selected position in said seismic data.

26. The method of claim 20 wherein (b) includes calculating a cosine of a phase associated with a complex trace computed from a seismic trace.

27. The method of claim 26 wherein said complex trace is computed using a Hilbert transform.

28. A seismic data processing system, comprising:

a processor;

a display coupled to said processor;

an input control device coupled to said processor, said processor receives seismic data, forms a data matrix, and calculates a coherence estimate for said data matrix using eigenvalues of said data matrix, wherein a similarity matrix is not calculated.

29. The seismic system of claim 28 wherein said processor decomposes said data matrix into three matrices.

30. The seismic system of claim 28 wherein said processor represents the data matrix as $UEV^T$, where T is the matrix transpose operator, U comprises a matrix containing the eigenvectors of a product of the data matrix ("A") and the transpose of A, $V^T$ comprises the transpose of a matrix containing the eigenvectors of a product of $A^TA$, and E comprises zero values and the eigenvalues of A.

31. The seismic system of claim 30 wherein said processor further calculates said eigenvalues.

32. The seismic system of claim 31 wherein said processor further calculates said coherency estimate as a function of the maximum eigenvalue of said eigenvalues.

33. The seismic system of claim 31 wherein said processor further calculates said coherency estimate as the maximum eigenvalue raised to a power k divided by a sum of each of the eigenvalues each eigenvalue in said sum raised to the power k.

34. The seismic system of claim 33 wherein k is approximately 2.

35. The method of claim 34 wherein k can be varied to emphasize geologic features in said seismic data.

36. The seismic system of claim 28 wherein said processor selects samples surrounding a selected position in said seismic data.

37. The seismic system of claim 28 wherein said processor calculates a cosine of a phase associated with a complex trace computed from a seismic trace.

38. The seismic system of claim 37 wherein said processor computes said complex trace using a Hilbert transform.

39. A seismic data processing system, comprising:

a processor;

a display coupled to said processor;

an input control device coupled to said processor, said processor receives seismic data, forms a data matrix, and calculates a maximum likelihood coherency estimate for said data matrix, wherein eigenvalues are not utilized to calculate said maximum likelihood coherency estimate.

40. The seismic system of claim 39 wherein said processor computes a covariance matrix.

41. The seismic system of claim 39 wherein said processor computes a product of the transpose of the data matrix ("A") and A.

42. The seismic system of claim 40 wherein said processor further normalizes said covariance matrix.

43. The seismic system of claim 42 wherein said processor further computes the logarithm of $1/(b^TC^{-1}b)$, wherein b is a vector in which all elements are 1, $C^{-1}$ is the inverse of the normalized covariance matrix and T is a transpose operator.

44. The seismic system of claim 39 wherein said processor selects samples surrounding a selected position in said seismic data.

45. The seismic system of claim 39 wherein said processor calculates a cosine of a phase associated with a complex trace computed from a seismic trace.

46. The seismic system of claim 45 wherein said processor computes said complex trace using a Hilbert transform.

47. A seismic data processing system, comprising:

a processor;

a display coupled to said processor;

an input control device coupled to said processor, said processor receives seismic data, forms a data matrix, and calculates a maximum entropy coherency estimate for said data matrix, wherein eigenvalues are not utilized to calculate said maximum entropy coherency estimate.

48. The seismic system of claim 47 wherein said processor computes a covariance matrix.

49. The seismic system of claim 47 wherein said processor computes a product of the transpose of the data matrix ("A") and A.

50. The seismic system of claim 48 wherein said processor normalizes said covariance matrix.

51. The seismic system of claim 50 wherein said processor computes the logarithm of $1/(b^Tc^Tcb)$, wherein b is a vector in which all elements are 1, $c^T$ is a transposed column of the inverse of the normalized covariance matrix, and T is a transpose operator.

52. The seismic system of claim 47 wherein said processor selects samples surrounding a selected position in said seismic data.

53. The seismic system of claim 47 wherein said processor calculates a cosine of a phase associated with a complex trace computed from a seismic trace.

54. The seismic system of claim 53 wherein said processor computes said complex trace using a Hilbert transform.

* * * * *